United States Patent [19]

Ouellette

[11] Patent Number: 5,327,089
[45] Date of Patent: Jul. 5, 1994

[54] PORTABLE ASSEMBLY FOR SUPPORTING MAGNETIC AND ELECTRICAL SENSORS

[75] Inventor: Charles W. Ouellette, Portsmouth, R.I.

[73] Assignee: Raytheon Company, Lexington, Mass.

[21] Appl. No.: 954,622

[22] Filed: Sep. 30, 1992

[51] Int. Cl.$^5$ .......................... G01V 3/00; G01V 3/08; G01V 3/40; G01R 33/02
[52] U.S. Cl. .................................. 324/345; 324/247; 324/347; 324/350; 324/365
[58] Field of Search ............... 324/326, 345, 347, 350, 324/365, 244, 247, 260

[56] References Cited

U.S. PATENT DOCUMENTS

| | | | |
|---|---|---|---|
| 2,123,045 | 7/1938 | Hoare | 324/345 X |
| 3,085,197 | 4/1963 | Hings | 324/345 |
| 3,514,693 | 5/1970 | Cagniard | 324/350 |
| 4,292,590 | 9/1981 | Wilson | 324/345 X |
| 4,388,592 | 6/1983 | Schonstedt | 324/247 |

FOREIGN PATENT DOCUMENTS 2579769 10/1986 France ........................ 324/345

OTHER PUBLICATIONS

Thorn EMI Electronics, "Signature measurement and control", Special Advertising Supplement to IDR 8, 1991, pp. 13-15.

Primary Examiner—Gerard R. Strecker
Attorney, Agent, or Firm—Donald F. Mofford; Richard M. Sharkansky

[57] ABSTRACT

A portable underwater mount for magnetic and electric field sensors. The mount has a gimbal-like structure comprising a ball member having a mounting flange for coupling to the magnetometer. The ball member is cast from polyurethane with Teflon powder suspended therein, providing a substantially frictionless surface. The ball member is disposed over a support platform having a spherical contour so that the weighted sensor positions itself to true vertical. A collar having a lock terminating in the support platform rests over the ball member so that once the sensor is oriented to magnetic north, the lock is engaged to secure the sensor in true vertical and magnetic north positions.

15 Claims, 3 Drawing Sheets

PORTABLE ASSEMBLY FOR SUPPORTING MAGNETIC AND ELECTRICAL SENSORS

BACKGROUND OF THE INVENTION

This invention relates generally to magnetic and electric field sensors and more specifically to an improved apparatus for supporting such sensors in order to provide quick and simple installation and alignment thereof.

As is known in the art, magnetic sensors or magnetometers are often used to measure the magnitude of the magnetic field associated with seagoing vessels. This operation is generally referred to as magnetic ranging or silencing. More specifically, ships and submarines periodically utilize such sensors to determine the magnetic signature or profile associated with the vessel since mines are activated by certain magnetic fields. The measured magnetic field information is interpreted and appropriate action taken in order to produce magnetic "silence." More specifically, often vessels have coils (i.e. degaussing coils) coupled to the outside of the hull. The magnetization of the vessel can be changed by subjecting these coils to an electrical current. With the magnetometer measurements and knowledge of the earth's magnetic field at the location of measurement, the appropriate current to be passed through the coils can be determined.

As is also known, one type of magnetometer is the triaxial flux-gate magnetometer comprised of three sensor elements disposed in a housing, orthogonally with respect to one another. Each sensor element comprises a relatively low permeability core, an excitation coil wound on the core, and a sense winding used to detect imbalances in the core brought about by the influence of external or ambient magnetic fields. With the use of suitable electronics, a periodic magnetic field is established within the core that has uniform amplitude within the core's volume.

A measure of the strength of the external magnetic field is provided by the sense winding which produces an electrical signal proportional to the core's magnetic field amplitude imbalance in the direction parallel to the sense coil's winding axis. Additional suitable electronics converts the sense winding signal into digitized data that can be readily communicated to a remote facility, such as a shore based ranging facility.

Other types of sensors often used to determine the complete signature of a ship or other vessel are alternating magnetic field (AM) sensors and underwater electric potential (UEP) sensors. Whereas the magnetometer senses the DC magnetic field associated with the vessel, the AM sensor measures the AC magnetic field and the UEP sensor measures both the AC and the DC electric fields associated with such vessel. The AM measurements are desirable since, in conjunction with the magnetometer measurements, they provide a thorough measurement of the vessel's magnetic signature. The electrical measurements achieved with the UEP sensors are desirable since mines may be activated by certain electric fields. Like the magnetometer, AM and UEP measurements require three sensor elements orthogonally disposed relative to one another.

For proper operation, it is necessary that the above-described magnetometer, AM, and UEP sensors be oriented to magnetic north and true vertical. Generally, magnetometers, AM sensors, and UEP sensors are located at permanent installation sites, such as in waters near a Naval base. At such sites, tubes are embedded vertically in the sea floor and the sensors are disposed in such tubes. More specifically, the tubes are filled with sea water and the sensor is suspended, for example by a rigid standoff pipe attached to a cap covering the tube. With this arrangement, the orientation of the sensor to true vertical and magnetic north is facilitated. The sensor is oriented to magnetic north either by an installer rotating the tube cap accordingly or alternatively such orientation may be achieved electronically. More particularly, the orientation to magnetic north is achieved by passing slowly through the null on the east/west axis and counter-rotating the cap to the null position.

This installation arrangement may be suitable in some instances, but in others, greater control and/or accuracy of the positioning may be desired. One solution to this problem has been the use of an "internal" gimbal arrangement disposed inside the magnetometer housing in which the three sensor elements are gimballed. However, due to the electrical wiring coupling the magnetometer to the shore based ranging facility and that interconnecting the internal sensor elements, the pivoting movement of such an internal gimbal may be restricted and/or the manufacture of such structure may be complex in an effort to prevent such restriction. Moreover, this apparatus may require a prohibitive length of time for proper alignment. That is, once the tube cap is rotated in accordance with magnetic north, the gimballed sensors must re-align themselves to true vertical and the gimbal may be susceptible to overshooting its desired position. Furthermore, regarding permanent ranging facilities, use of such permanently installed sensors (i.e. installed in tubes embedded in the sea floor) may not be feasible since it may take several days to travel from the permanent installation site to a battle zone and the transit could cause undesirable changes in the magnetic signature of the vessel.

SUMMARY OF THE INVENTION

With the foregoing background in mind, it is an object of the present invention to provide an improved magnetic and/or electric field sensor assembly.

It is a further object to provide apparatus for supporting such sensors in a readily portable manner.

Still another object is to provide such apparatus to allow for quick and simple sensor installation and alignment.

Another object is to provide such apparatus to be compatible with magnetometers adapted for permanent installation.

An additional object is to provide a sensor support structure for mounting different types of sensors, such as magnetometers, alternating magnetic (AM) sensors, and underwater electrical potential (UEP) sensors, in order to provide operational versatility.

Another object is to provide such a sensor support structure for simultaneously mounting different types of sensors.

These and other objects of the present invention are attained generally by providing apparatus for supporting a magnetic sensor comprising a pedestal and a sensor module. The pedestal comprises a platform and a plurality of supporting feet spaced from the platform by a corresponding plurality of supporting legs. The platform has an aperture and a portion of a spherical surface disposed adjacent to the aperture. The sensor module includes a ball member having a spherical shape complimentary to the spherically shaped portion of the platform, with said ball member being disposed over such portion of the platform. The ball member has a flange adapted for mating with the magnetic sensor, with such sensor extending down through the aperture in the platform. In the preferred supporting apparatus, each of the supporting feet is coupled to a corresponding one of the supporting legs by a ball joint and the apparatus further includes a locking cover to secure the sensor module at a desired position.

With this arrangement, an improved magnetic sensor assembly is provided with ease of installation and alignment. More particularly, the support structure including the pedestal and sensor module allows for simple and quick installation. During installation, the supporting feet automatically pivot to contact the contour of the installation surface (i.e. generally an ocean or harbor floor). The ball member which is disposed over the platform pivots over the complementary shaped portion of a spherical surface of the platform until it is aligned to true vertical. The ball member, and thus also the magnetic sensor mated therewith, is oriented to magnetic north, after which the locking cover is employed to secure this desired orientation. In this way, the magnetic sensor is quickly and easily installed. The result is magnetic sensor supporting apparatus that is readily portable in a quick and easy manner. The portable range allows the magnetic ranging of the vessel, and where necessary the calibration of the vessel's degaussing system, to be performed in relatively close proximity to the battle zone, thus ensuring that the magnetic signature of the vessel is optimized for battle conditions.

In accordance with a further aspect of the invention, apparatus is provided for supporting a magnetometer and an alternating magnetic sensor comprising a pedestal and a sensor module. The pedestal comprises a platform and a plurality of supporting feet spaced from the platform by a plurality of supporting legs. The platform has an aperture and a spherically shaped portion disposed adjacent to the aperture. The sensor module includes a ball member having a spherical shape complementary to the portion of a spherical surface of the platform and is disposed thereover. The ball member further includes a flange for mating with the magnetometer. The sensor module further comprises a block coupled to a lower end of the magnetometer and having an aperture adapted for receiving the alternating magnetic sensor. The preferred apparatus further includes a locking cover for securing the sensor module in a desired position, here such position being in accordance with magnetic north and true vertical. Additionally, the block may have a second aperture disposed therethrough and adapted for receiving an underwater electric potential sensor.

With this arrangement, a versatile magnetic sensor assembly is provided with the capability of making DC and AC magnetic field measurements as well as DC and AC electric field measurements. This arrangement reduces both the time and cost associated with "silencing" a vessel since the separate support structures heretofore required to complete the process are eliminated. Moreover, the apparatus is readily portable thereby allowing the magnetic ranging of the vessel to be performed in relatively close proximity to the battle zone, thus ensuring that the magnetic signature of the vessel is optimized for battle conditions.

BRIEF DESCRIPTION OF THE DRAWINGS

The foregoing features of this invention, as well as the invention itself, may be more fully understood from the following detailed description of the drawings, in which.

DESCRIPTION OF THE PREFERRED EMBODIMENTS

Figure 1:
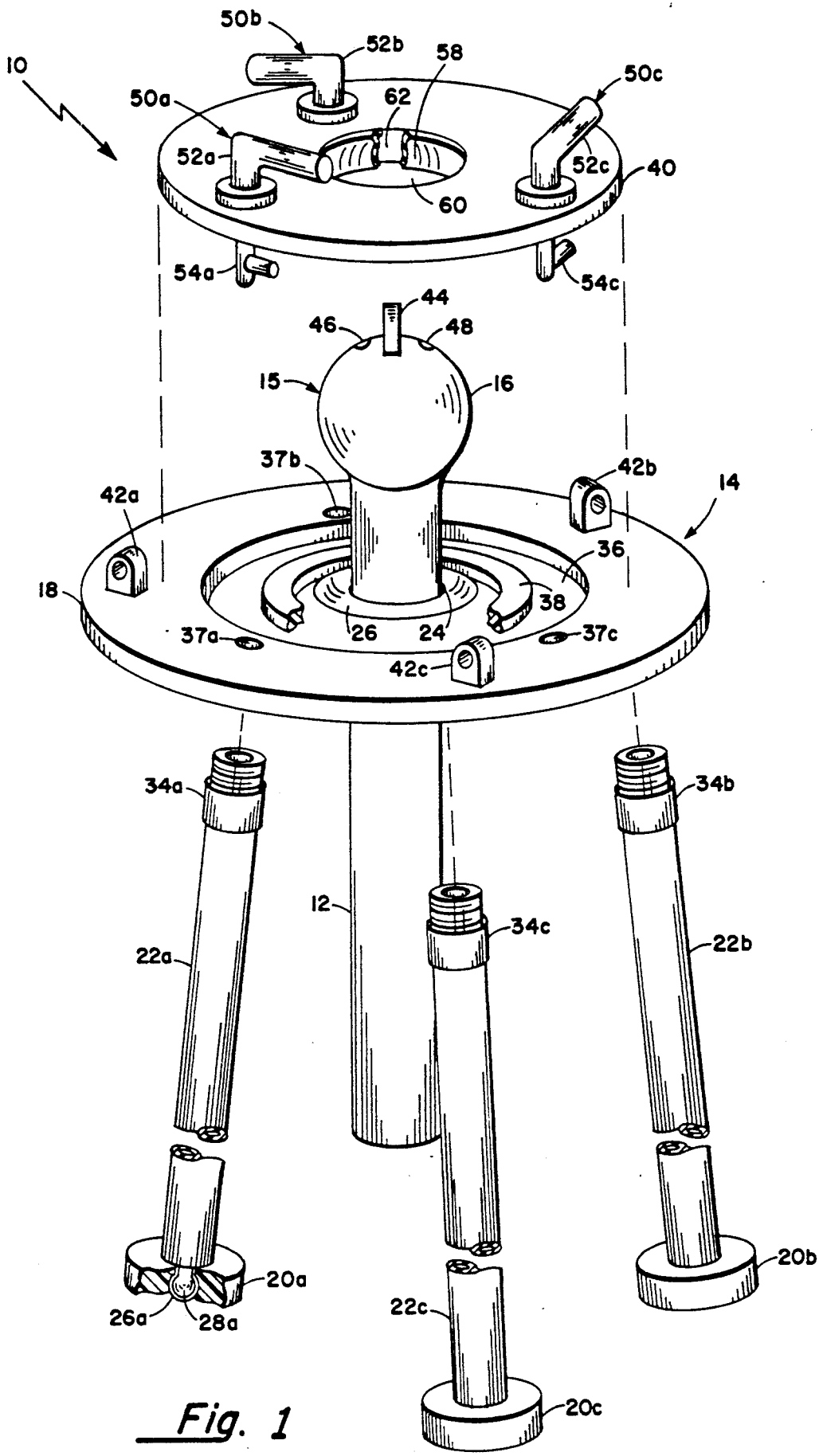
FIG. 1 is an exploded isometric view of a magnetic sensor assembly in accordance with the invention.
Figure 2:
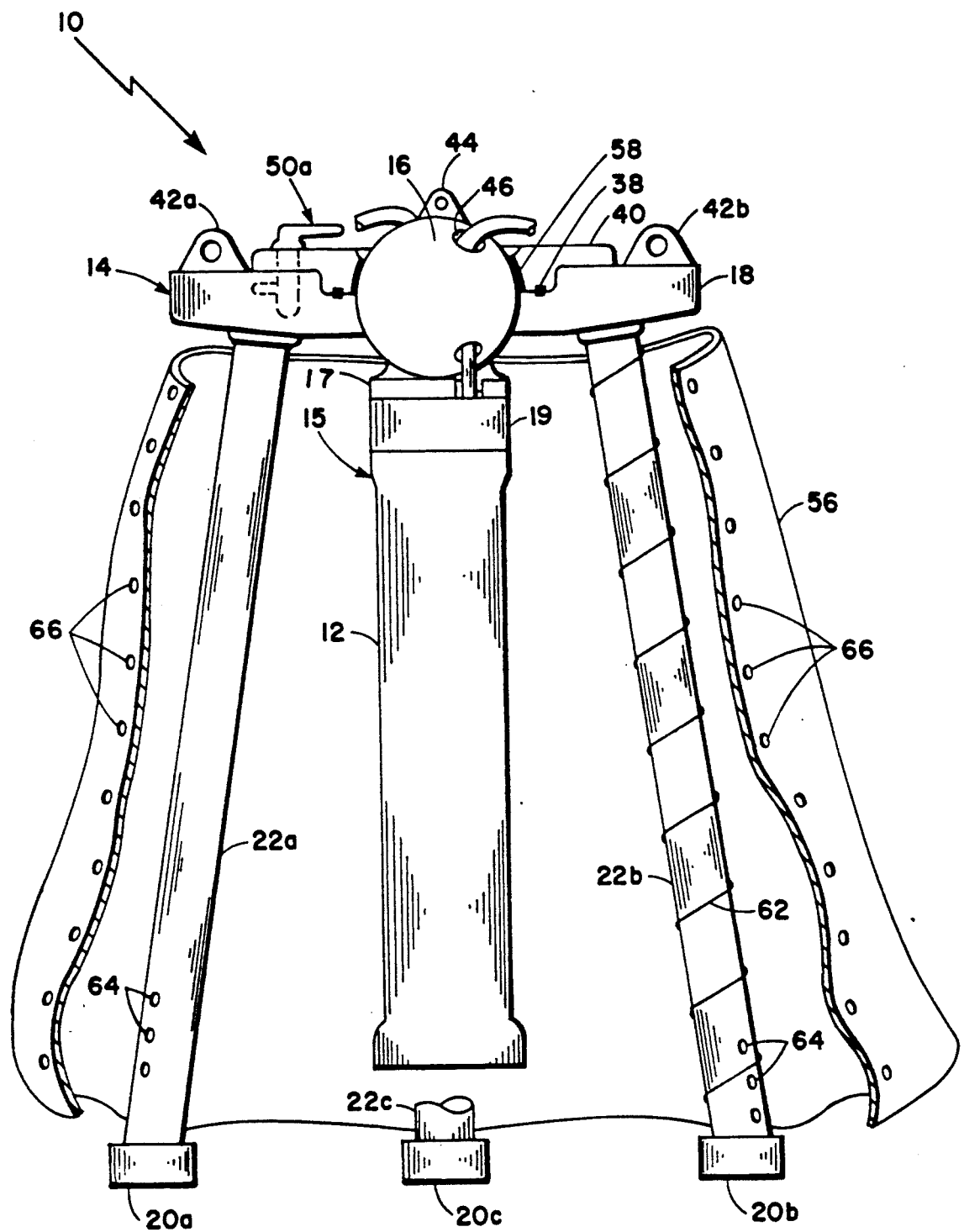
FIG. 2 is a partially cross-sectioned side view of the apparatus of FIG. 1.

Referring now to FIGS. 1 and 2, a magnetic sensor assembly 10 (herinafter also referred to as portable assembly 10) is shown to include a supporting member or pedestal 14 (FIG. 2), and a sensor module 15. The pedestal 14 comprises a platform 18, a plurality of supporting legs 22a-22c, and a plurality of supporting feet 20a-20c spaced from the platform 18 by the corresponding plurality of supporting legs 22a-22c. The platform 18 has an aperture 24 disposed therethrough and a portion 26 of a spherical surface disposed adjacent to the aperture 24. The sensor module 15 includes a ball member 16 having a spherical shape, complementary to the portion 26 of a spherical surface of platform 18 and disposed thereover. The ball member 16 further has a flange 17 (FIG. 2) extending downward and adapted for mating with a magnetometer 12, as will be described. As shown, magnetometer 12 extends down through the aperture 24 in the platform 18. A pair of through holes 46, 48 are disposed in the ball member 16 for routing electrical wires or cables from the magnetometer 12 to a vessel or shore based ranging facility.

Referring now specifically to FIG. 1, the assembly of magnetic sensor 10 will now be described. As noted, the magnetic sensor assembly 10 includes a pedestal 14 and a sensor module 15. More specifically, the pedestal 14 provides means for supporting the sensor module 15. Sensor module 15 includes a magnetic sensor, and here a magnetometer 12, and a ball member 16 attached to the magnetometer 12. Here, magnetometer 12 has a flange 19 (FIG. 2) extending upwardly from the upper end thereof, (i.e. that end disposed distal from supporting feet 20a-20c). The flange has a plurality of threaded holes. The ball member 16 has a complementary flange 17, (FIG. 2) extending downward, here having a like plurality of threaded holes. With this arrangement, the flanges 17, 19 (FIG. 2) of the ball member 16 and the magnetic sensor 12 are aligned so that the holes line up for insertion of a fastening member, such as a screw. This arrangement for mounting the magnetic sensor 12 to the ball member 16 is particularly desirable since the sensor flange is compatible with prior art permanent installation schemes. That is, in prior art sensor support structures, such as tubes embedded into an ocean floor, the standoff pipe has through holes corresponding to those on the sensor flange, as described above. Thus, conventional magnetometers 12 (i.e. with conventional flanges) are readily adaptable for use with the present supporting scheme.

It is further noted with respect to ball member 16 that such member includes through holes 46, 48 for routing wires to the ranging facility or to other, series coupled magnetometers. While conventional ranging facilities are shore based, such as a Naval base, with the present, readily portable assembly 10, the ranging facility is likely to be the vessel itself. That is, because of the ease with which assembly 10 is installed, as will be described, such assembly is suitable for temporary installation by vessels requiring magnetic silencing. In this way, the time and cost associated with travelling to permanent magnetometer installation sites is avoided. Moreover, the ineffectiveness of using permanent ranging facilities resulting from the magnetic signature of the vessel changing during transit from the permanent ranging facility to a battle zone is eliminated. That is, with readily portable assembly 10, the ranging can be achieved in close proximity to the battle zone.

The lower end of the sensor 12 (i.e. that end disposed proximal to the plurality of supporting feet 20a-20c) has a ballast (not shown) attached thereto, as is conventional. Here, the ballast weighs approximately thirty lbs. in water. The purpose of the ballast is to provide sufficient restoring force, here approximately one hundred ft-lbs., to cause the magnetometer 12 to pivot to true vertical, as will be described below.

Referring now to the pedestal 14, it is noted that such supporting member is comprised of platform 18, the plurality of supporting feet 20a-20c, and the corresponding plurality of supporting legs 22a-22c. In assembly, the supporting legs 22a-22c are attached to a corresponding one of the plurality of supporting feet 20a-20c. Considering for example supporting foot 20a (shown partially broken away in FIG. 1), noting that the attachment of foot 20a to corresponding supporting leg 22a is exemplary of supporting feet 20b-20c, foot 20a is shown to include a socket 26a. Each of supporting legs 22a-22c has a ball 28a-28c disposed on the lower end thereof adjacent to the corresponding foot 20a-20c. In assembly, the balls 28a-28c of legs 22a-22c are inserted into the corresponding sockets 26a-26c with supporting feet 20a-20c. With this arrangement, the supporting feet 20a-20c are pivotally engaged with the corresponding supporting legs 22a-22c. More specifically, the feet 20a-20c are free to pivot in all directions (i.e. the feet 20a-20c are free to rotate 360 degrees) with respect to the corresponding legs 22a-22c. Thus, when the magnetic sensor assembly 10 is placed on a surface (for example during installation on an ocean floor), each of the plurality of supporting feet 20a-20c pivots to contact the installation surface. This arrangement improves the stability of the overall magnetic sensor assembly 10 by ensuring contact with the potentially non-uniform installation surface.

The upper ends of each of the supporting legs 22a-22c (i.e. distal from supporting feet 20a-20c) have threaded collars 34a-34c (FIG. 1), respectively, attached thereto as shown. Here, the supporting legs 22a-22c are comprised of dense polyurethane and the corresponding collars 34a-34c may be molded integrally therewith or may be formed separately and attached thereto by any suitable adhesive.

Considering next the platform 18, as noted above, the platform 18 has an aperture 24 and a portion 26 of a spherical surface disposed adjacent to the aperture 24. Here, the platform 18 is comprised of polyurethane impregnated with Teflon. The portion 26 is concave when viewed from the upper or top surface of platform 18 (i.e. that surface which is distal from supporting feet 20a-20c) and convex when viewed from the bottom surface thereof. Platform 18 has a plurality of threaded recesses (not shown) on the bottom surface thereof corresponding to the plurality of supporting legs 22a-22c. More particularly, the threaded recesses are adapted to mate with threaded collars 34a-34c. With this arrangement, pedestal 14 is assembled by screwing the supporting legs 22a-22c and more specifically the collars 34a-34c, into the threaded recesses to provide fixed coupling between the platform 18, the supporting legs 22a-22c, and the ball joint coupled supporting feet 20a-20c. Here three supporting legs 22a-22c are used and in assembly, such legs 22a-22c form a tripod. Tripod pedestal 14 here has a lower diameter of approximately forty-six inches, an upper diameter of approximately thirty inches, and a height of approximately eighty-four inches.

Referring still to pedestal 14 and more specifically to platform 18, it is noted that the upper surface thereof has a recess 36 having a diameter somewhat larger than the diameter of the portion 26, as shown. Disposed within the recess 36 is a compression ring 38, shown partially broken away in FIG. 1. Compression ring 38 is comprised of an elastomer material, here rubber. In assembly, ring 38 is compressed and, in conjunction with a locking cover 40, holds the sensor module 15 stationary, as will be described. Suffice it here to say however that the compression ring 38 may either be secured to the upper surface of platform 18, such as by any suitable adhesive, or alternatively may be placed over the platform 18 during assembly (i.e. rather than being fixed to such platform 18).

It is further noted with regard to platform 18, that a plurality of lifting eyes 42a-42c are coupled to the upper surface thereof. The purpose of lifting eyes 42a-42c is to provide means for coupling the magnetic sensor assembly 10 to a vessel so that the assembly 10 may be lowered to the installation site. More specifically, during installation, the magnetic sensor assembly 10 is lowered from a vessel by means of cable or line coupled to the lifting eyes 42a-42c. Once the assembly 10 is disposed on the ocean floor for example, the installer may disengage the lowering line from the lifting eyes 42a-42c. Alternatively however, it may be desirable to maintain the line coupling the assembly 10 to the vessel in order to facilitate removal of the portable assembly 10.

A shroud 56 (FIG. 2) is wrapped around supporting legs 22a-22c. Here, shroud 56 is comprised of canvas and is provided to stabilize the assembly 10. Both ends of shroud 56 have a plurality of holes 66 through which a lashing 62 is wrapped to secure the shroud 56 around the tripod pedestal 14. Note that the bottom of the tripod pedestal 14 is exposed to the surrounding water environment. That is, the center of tripod pedestal 14 is filled with water. The shroud 56 stabilizes magnetic sensor assembly 10 by providing virtual mass. To further improve the stability of the assembly 10, supporting legs 22a-22c are flooded with water to eliminate undesirable buoyancy. To this end, holes 64 (FIG. 2) are provided in supporting legs 22a-22c in order to allow water to enter the hollow legs 22a-22c.

As mentioned, during installation, the assembly 10 is lowered to the desired installation site. Once on the ocean floor for example, the locking cover 40 is unlocked (if previously locked) with the use of a plurality, and here three, turn locks 50a-50c. More particularly, each of the turn locks 50a-50c is comprised of a handle 52a-52c and a latch 54a-54c, respectively, with the handles 52a-52c extending upward from a top surface of the locking cover 40 and the corresponding latches 54a-54c extending downward from the bottom surface of locking cover 40 at a position under the corresponding handle 52a-52c, as shown. When the handles 52a-52c are in first, unlocked positions, the corresponding latches 54a-54c extend through corresponding apertures 37a-37c disposed through platform 18. When the turn locks 50a-50c, and more specifically the handles 52a-52c thereof, are turned, here approximately ninety degrees, the latches 54a-54c are concomitantly turned. More specifically, when latches 54a-54c are turned, they engage with the bottom surface of platform 18 so that the locking cover 40 cannot be raised or lifted. In this way, the cover 40 is locked down over the ball member 16 and platform 18. When cover 40 is locked into position, compression ring 38 is compressed, as noted above.

Further with regard to locking cover 40, it is noted that such cover is here comprised of dense polyurethane. The bottom surface of cover 40 has a step formed therein so that, in assembly, the cover 40 fits into the recess 36 of platform 18. More particularly, the inner portion of the cover 40 has a larger thickness than an outer portion thereof, so that the inner portion fits into recess 36 and the outer portion extends onto platform 18 adjacent recess 36 as can be readily seen in the cross-section of FIG. 2. The outer portion of platform 18 is that through which turn locks 50a-50c are disposed. Locking cover 40 has an aperture 60 (FIG. 1) disposed therethrough which, in assembly is aligned with the aperture 24 in platform 18. In assembly, locking cover 40 is seated down over ball member 16 and platform 18, as shown in FIG. 2, with the bottom surface thereof contacting compression ring 38. It is the force of locking cover 40, particularly when locked, that compresses ring 38. The side 62 (FIG. 1) of locking cover 40 adjacent to aperture 60 has a spherical contour complementary to that of ball member 16. Locking cover 40 includes a layer 58 of elastomer material, here rubber, disposed over side 62 thereof, shown partially broken away to expose a portion of side 62 in FIG. 1. In assembly, elastomer layer 58 contacts ball member 16.

The purpose of elastomer layer 58, as well as of compression ring 38, is to prevent slippage of the ball member 16 after installation and alignment. That is, once magnetometer 12 is aligned to magnetic north and true vertical, it is desirable that it be locked securely in place so that it is not susceptible to movement, such as may be caused by current flow. Due to the low friction coefficient of the material comprising platform 18 and ball member 16 (provided to ensure ease of pivoting during alignment, as will be described), the elastomer material of compression ring 38 and layer 58 prevents any such movement once cover 40 is locked.

Upon lowering the assembly 10 to the desired installation location and unlocking cover 40, the magnetometer 12 is orientated to the proper position. That is, the magnetometer 12 is orientated to magnetic north and true vertical. First, the magnetometer 12 and ball member 16 are oriented to magnetic north, either by the installer or electronically. This is done by rotating the sensor module 15 until the null of the east/west axis is passed (i.e. as indicated as a zero magnetic field reading). Once the null point is passed, the module 15 is counter-rotated to the null position. Also, it may be desirable to use a non-magnetic rod (not shown) disposed through an eye member 44 extending upward from the ball member 16. That is, the installer inserts such a rod through the eye member 44 and pushes or pulls the rod to turn the sensor module 15. The rod assists in the orientation process by providing increased leverage for turning sensor module 15.

Once the sensor module 15 is orientated to magnetic north, the module 15 pivots or gimbals within the portion 26 of platform 18 due to the force provided by the ballast. This pivoting of ball member 16 and magnetometer 12 serves to position the magnetometer 12 at true vertical. With the magnetometer 12 thus positioned to magnetic north and true vertical, the locking cover 40 is locked. That is, the turn locks 50a-50c are turned to engage the latches 54a-54c with the bottom surface of platform 18. With this arrangement, the sensor module 15 is locked into place and will not move in response to vibrations, such as may be caused by passing vessels or currents.

With the above described sensor supporting structure and installation thereof, an improved magnetic sensor assembly 10 is provided with eased installation and alignment. More particularly, the sensor module 15 is turned, and thus also the magnetometer 12 mated therewith, to face magnetic north, as described. The pedestal 14 and sensor module 15 arrangement with which the ball member 16 pivots or gimbals to true vertical allows for simple and quick alignment to true vertical. Once the magnetometer 12 is so aligned, the locking cover 40 is employed to secure this desired orientation. In this way, the magnetometer 12 is quickly and easily installed. The result is magnetic sensor supporting apparatus 10 that is readily portable in a quick and easy manner. In fact, the installation and alignment of magnetometer assembly 10 takes an installer less than approximately eight hours to complete.

Figure 3:
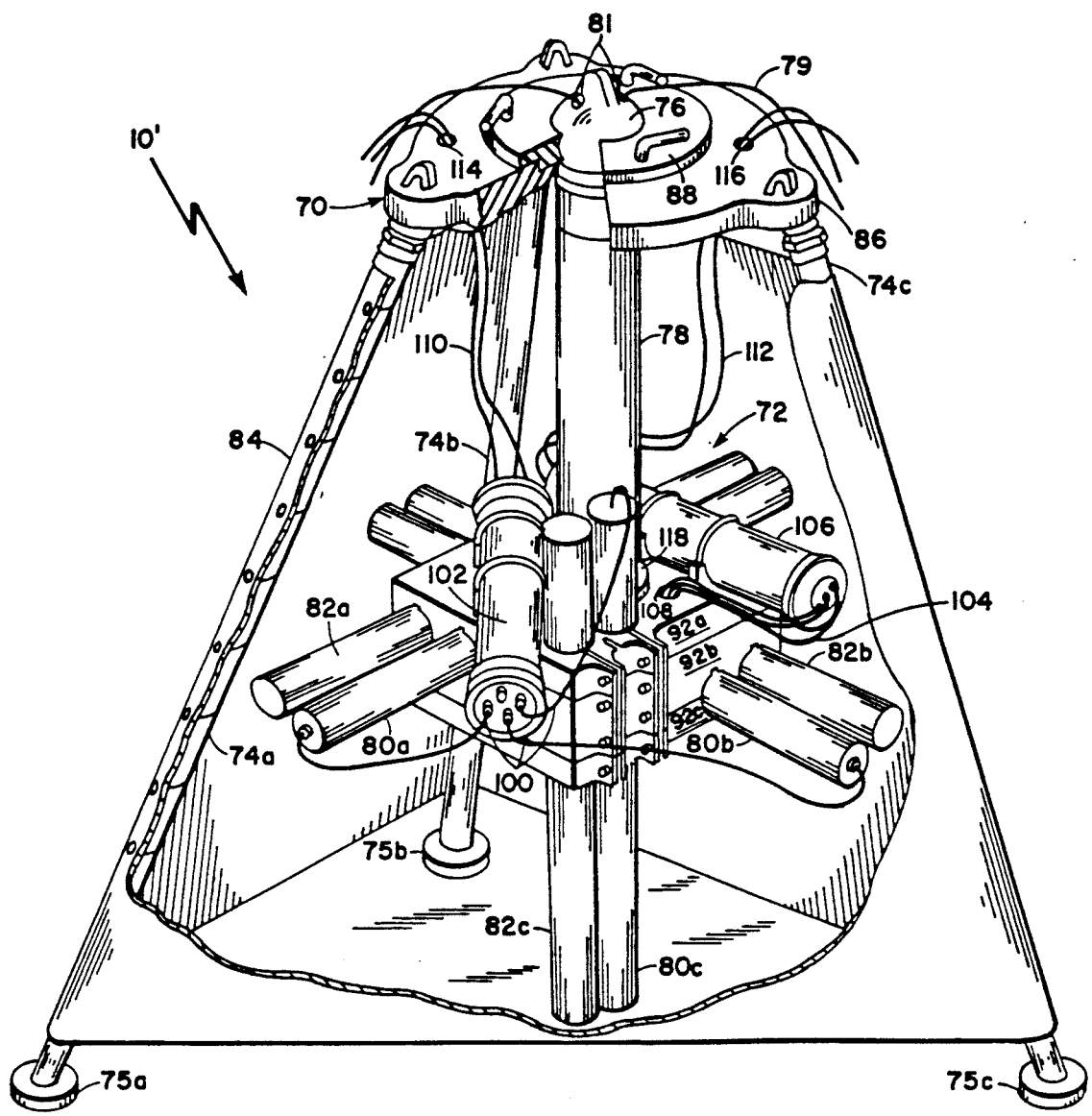
FIG. 3 is a partially broken away isometric view of a further aspect of the invention.

Referring now to FIG. 3, a further aspect of the present invention is shown in conjunction with a magnetic sensor assembly 10', to include a pedestal 70 and a sensor module 72. Sensor module 72 is adapted to support different types of sensors and thus, provides operational versatility as will be described. Here, pedestal 70 is similar to pedestal 14 (FIGS. 1 and 2) with the following exceptions. The supporting legs 74a-74c of pedestal 70 are more widely spaced than those 22a-22c of pedestal 14. More specifically, the tripod pedestal 70 has a lower diameter of seventy inches and an upper diameter of forty inches. Another difference between tripod pedestals 14 and 70 is that the latter pedestal 70 has a larger height than pedestal 14. Specifically, pedestal 70 has a height of approximately eighty-seven inches.

Larger tripod pedestal 70 is so provided in order to accommodate sensor module 72 which includes a ball member 76 (like ball member 16 of sensor module 15), a magnetometer 78 (like magnetometer 12 of sensor module 15), an alternating magnetic (AM) sensor comprising three AM sensor elements 80a-80c, and an underwater electric potential (UEP) sensor comprising three UEP sensor elements 82a-82c. In assembly, tripod pedestal 70 has a canvas shroud 84 wrapped around supporting legs 74a-74c similar to shroud 56 of magnetometer assembly 10 (FIGS. 1 and 2). Here, shroud 84 is shown partially broken away to expose sensor module 72. Before discussing module 72, it is noted that in other respects (besides the above discussed differences), pedestal 72 is like pedestal 14 of FIG. 2. That is, for example, pedestal 70 comprises a platform 86 having a recess disposed in a top surface thereof, as shown in the broken away portion of FIG. 3. The platform 86 further has a portion of a spherical surface (similar to portion 26 as shown in FIG. 1) disposed in the top surface thereof in which ball member 76 rests in assembly. Also provided is a locking cover 88 which is similar to cover 40 of assembly 10 (FIGS. 1 and 2). Further supporting feet 75a-75c are like supporting feet 20a-20c of FIGS. 1 and 2 in that they comprise ball joints.

Considering next the sensor module 72 in greater detail, the magnetometer 78 is coupled to the ball member 76 in a manner similar to that described in conjunction with magnetometer 12 and ball member 16 above. Here however, the lower end of magnetometer 78 has an outwardly extending, orthogonally disposed flange 118 (partially shown in FIG. 3) with which magnetometer 12 is attached to an alignment block 92a. Wires 79 coupling magnetometer 78 to the measuring facility (i.e. in the case of readily portable assembly 10' generally a vessel rather than a shore based facility) as described above in conjunction with magnetometer 12 and here, are disposed through holes 81 in the ball member 76, as shown. The ballast described above in conjunction with magnetometer 12 and provided for forcing the sensor 12 to pivot to true vertical is here disposed underneath alignment blocks 92a-92c. That is, a flange (not shown), similar to flange 118, is coupled to alignment block 92c which in turn is coupled to a ballast (not shown).

Sensor module 72 here includes three alignment blocks 92a-92c disposed in a vertically stacked arrangement. Alignment blocks 92a-92c provide means for supporting the plurality of AM and UEP sensor elements 80a-80c, 82a-82c and associated electronics 102, 106, respectively, as well as the ballast described above. For proper operation, each of the three AM sensor elements 80a-80c are disposed orthogonally with respect to one another. Likewise, the three UEP sensor elements 82a-82c are disposed orthogonally with respect to one another, as shown. In assembly, each of the AM sensor elements 80a-80c and UEP sensor elements 82a-82c are sandwiched between two of the stacked alignment blocks 92a-92c, as shown. Here, such sensor elements 80a-80c, 82a-82c extend all the way through the alignment blocks 92a-92c. Thus, the sensor elements 80a-80c, 82a-82c are sandwiched between different ones of the alignment blocks 92a-92c. Stated differently, the horizontally disposed sensor elements 80a-80b, 82a-82b are at different horizontal levels (i.e. sensor elements 80a, 82a being sandwiched between alignment blocks 92a and 92b whereas sensor elements 80b, 82b are sandwiched between alignment blocks 92b and 92c). Vertically disposed sensor elements 80c, 82c are disposed through aligned apertures in each of the three alignment blocks, 92a-92c. Once the sensor elements 80a-80c and 82a-82c are so positioned, the alignment blocks 92a-92c are secured together with polyurethane nuts and bolts to keep the sensor elements 80a-80c, 82a-82c stationary.

Processing electronics for both the AM and UEP sensor elements 80a-80c, 82a-82c are coupled to the sensor module 72 in cylindrical electronics housings 102, 106, respectively. AM and UEP electronics housings 102, 106, respectively, are mounted on the top of alignment block 92a by brackets. The wires 100 coupling the AM sensor elements 80a-80c to AM processing electronics 102 are routed from the ends thereof whereas, those wires 104 coupling the UEP sensors 80a-80c to UEP processing electronics 106 are routed from a central portion of such elements 82a-82c (not shown) disposed within the alignment blocks 92a-92c. More specifically, the wires 104 from the centers of UEP sensors 82a-82c are routed through apertures (not shown) in the alignment blocks 92a-92c and exit such blocks 92a-92c through an aperture 108 in alignment block 92a, as shown. From aperture 108, wires 104 are coupled to the UEP electronics 106, as shown. Output wires 110, 112 from electronics housings 102, 106, respectively are coupled to the measuring facility. Here, such wires are routed through holes 114, 116 disposed through platform 86, as shown, for further coupling to the measuring facility.

With the above-described sensor assembly 10', operating versatility is provided by supporting three types of sensors on one supporting structure. That is, with only one assembly 10', the strength of the magnetic signature of a vessel can be measured by the triaxial magnetometer 78, the alternating magnetic field can be measured by the AM sensor elements 80a-80c, and the electric potential, both AC and DC, of the vessel may be measured by the UEP sensor elements 82a-82c. Thus, the cost associated with such measurements is reduced since only one such assembly 10' need be installed to make any of the desired measurements. Moreover, due to the portability of the assembly 10' (discussed in detail above in conjunction with similar tripod pedestal 14), the cost of making such measurements is further reduced. That is, such cost reduction is brought about by the reduced time associated with the measurement process, and particularly with the installation and removal of the measuring apparatus. More importantly however, the effectiveness of the ranging is improved since the measurements can be made in close proximity to a battle zone. That is, undesirable changes in the magnetic signature of the vessel heretofore potentially occurring during transit from a permanent ranging facility to a battle zone are avoided.

Having described preferred embodiments of the invention, it will now become apparent to one of skill in the art that other embodiments incorporating their concepts may be used. For example, it should be apparent that sensor module 72 may be of various construction for supporting any combination of magnetic and electrical sensors. It is felt, therefore, that these embodiments should not be limited to disclosed embodiments, but rather should be limited only by the spirit and scope of the appended claims.

What is claimed is:

1. A portable assembly for supporting a magnetic sensor comprising:
   a pedestal comprising a platform and a plurality of supporting legs, each one of the plurality of supporting legs connected to the platform, said platform having an aperture and a portion of a spherical surface disposed with said aperture extending through said portion;
   a sensor module comprising a ball member having a spherical shape complementary to said portion of said platform and disposed over said portion of said platform, said ball member having a flange adapted for mating with a magnetic sensor, wherein said sensor module extends down through said aperture in said platform; and
   a locking cover having an aperture, said locking cover disposed over said ball member with the ball member extending into the aperture of the locking cover.

2. The portable assembly as recited in claim 1 comprising three supporting feet and three corresponding supporting legs, each one of the three supporting feet connected to one of the three corresponding supporting legs, to form a tripod.

3. The portable assembly as recited in claim 1 further comprising an eye member attached to said ball member to facilitate rotating of said sensor module.

4. The portable assembly as recited in claim 1 wherein said locking cover has a surface adjacent to said aperture, with said surface having a spherical contour.

5. The portable assembly as recited in claim 4 further comprising a layer of elastomer disposed over said surface of said locking cover and contacting said ball member.

6. The portable assembly as recited in claim 4 wherein said locking cover comprises a vertically extending lock comprising a handle extending from the upper surface of said locking cover and a latching member extending from a lower surface thereof, wherein said platform has a locking aperture disposed vertically therethrough, wherein said latching member extends through said locking aperture.

7. The portable assembly as recited in claim 1 further comprising a shroud disposed around said supporting legs.

8. The portable assembly as recited in claim 2 wherein each of the supporting feet is connected to a corresponding one of said supporting legs by a ball joint.

9. A portable assembly for supporting a magnetometer and an alternating magnetic sensor comprising:
a pedestal comprising a platform, a plurality of supporting feet and a plurality of supporting legs, each one of the plurality of supporting legs connected to the platform and to a corresponding one of the plurality of supporting feet, said platform having an aperture and a portion of a spherical surface disposed with said aperture extending through said portion;
a sensor module comprising:
a magnetometer;
a ball member having a spherical shape complementary to said portion of said platform and disposed over said portion of said platform, said ball member having a flange adapted for mating with said magnetometer, wherein said senor module extends down through said aperture in said platform; and
a block coupled to said magnetometer and having an aperture disposed therethrough adapted for receiving an alternating magnetic sensor; and
a locking cover having an aperture, said locking cover disposed over said ball member with the ball member extending into the aperture of the locking cover.

10. The portable assembly as recited in claim 9 wherein said block further has a second aperture disposed therethrough and adapted for receiving an underwater electrical potential sensor.

11. The portable assembly as recited in claim 9 further comprising an eye member attached to said ball member to facilitate rotating of said sensor module.

12. The portable assembly as recited in claim 9 wherein said locking cover comprises a vertically extending lock comprising a handle extending from the upper surface of said locking cover and a latching member extending from a lower surface thereof, wherein said platform has a locking aperture disposed vertically therethrough, wherein said latching member extends through said locking aperture.

13. The portable assembly as recited in claim 9 further comprising a shroud disposed around said supporting legs.

14. The portable assembly as recited in claim 1 comprising a compression ring comprising an elastomer material disposed between the platform and the locking cover.

15. A portable assembly for supporting magnetic and electrical sensors underwater comprising:
a pedestal comprising a platform and a plurality of supporting legs, each one of the plurality of supporting legs connected to the platform;
means for mounting and manually adjusting a sensor to align with true north and for affixing the sensor to the platform, said mounting and manually adjusting and affixing means comprising:
a portion of the platform having a spherical surface disposed within the platform;
a ball member having a spherical shape complementary to said portion of the platform to mate with said portion of the platform, said ball member attached to said sensor;
a locking cover having a portion of a spherical surface disposed within the locking cover complementary with said ball member; and
means for affixing the locking cover to the platform with the ball member disposed between the platform and the locking cover; and
a shroud disposed around said supporting legs.

* * * * *